(12) United States Patent
Woodring

(10) Patent No.: US 7,020,660 B2
(45) Date of Patent: Mar. 28, 2006

(54) DATA OBJECT GENERATOR AND METHOD OF USE

(75) Inventor: John Woodring, Ambler, PA (US)

(73) Assignee: Siemens Medical Solutions Health Services Corp., Malvern, PA (US)

( * ) Notice: Subject to any disclaimer, the term of this patent is extended or adjusted under 35 U.S.C. 154(b) by 475 days.

(21) Appl. No.: 10/167,964

(22) Filed: Jun. 12, 2002

(65) Prior Publication Data

US 2003/0004979 A1   Jan. 2, 2003

Related U.S. Application Data

(60) Provisional application No. 60/302,086, filed on Jun. 29, 2001.

(51) Int. Cl.
   *G06F 7/00*   (2006.01)
   *G06F 9/44*   (2006.01)
(52) U.S. Cl. .............. 707/103 R; 707/100; 707/103 Y; 707/104.1; 717/100; 717/122
(58) Field of Classification Search ................ 707/100, 707/103 Y, 104.1; 717/100, 122
See application file for complete search history.

(56) References Cited

U.S. PATENT DOCUMENTS

| | | | |
|---|---|---|---|
| 5,499,371 A | 3/1996 | Henninger et al. | |
| 5,732,274 A | 3/1998 | O'Neill | |
| 5,884,317 A | 3/1999 | Cline et al. | |
| 6,167,405 A | 12/2000 | Rosensteel, Jr. et al. | |
| 6,199,195 B1 | 3/2001 | Goodwin et al. | |
| 6,226,656 B1 | 5/2001 | Zawadzki et al. | |
| 6,256,773 B1 | 7/2001 | Bowman-Amuah | |
| 6,324,576 B1 | 11/2001 | Newcombe et al. | |
| 6,604,100 B1 * | 8/2003 | Fernandez et al. | 707/3 |
| 6,615,253 B1 * | 9/2003 | Bowman-Amuah | 709/219 |
| 2004/0022379 A1 * | 2/2004 | Klos et al. | 379/201.01 |

\* cited by examiner

*Primary Examiner*—Alford W. Kindred
(74) *Attorney, Agent, or Firm*—Alexander J. Burke

(57) ABSTRACT

The present invention creates source code that can be used by an application program to manipulate a relational database management system. An executable procedure for use in accessing a database management system (DBMS) by other software, e.g. application software, is created by dynamically obtaining a set of data representative of and useful in manipulating the DBMS and a table within the DBMS from a preexisting DBMS system catalog; merging the set of data with pre-existing source code comprising a predetermined object source code template that comprises object methods and object properties useful in manipulating the table; and generating a source file containing the merged template object source code to create the executable procedure. It is emphasized that this abstract is provided to comply with the rules requiring an abstract which will allow a searcher or other reader to quickly ascertain the subject matter of the technical disclosure. It is submitted with the understanding that it will not be used to interpret or limit the scope of meaning of the claims.

30 Claims, 3 Drawing Sheets

DATA OBJECT GENERATOR AND METHOD OF USE

RELATED APPLICATIONS

This application claims priority through U.S. Provisional Application No. 60/302,086 filed Jun. 29, 2001 by J. Woodring for "Data Object Generator."

FIELD OF THE INVENTION

The present invention relates to interfaces to database management systems and more specifically to programmatic creation of software object interfaces to database management systems.

BACKGROUND OF THE INVENTION

Many computer applications need to manipulate a database and its internal components, e.g. tables, such as by storing records into and retrieving records from those tables. The database may be a traditional database management system (DBMS) such as a relational DBMS.

This manipulation often requires an application programmer to write specific code for each table. The coding effort is often tedious, is prone to errors, and requires a considerable amount of time, especially as the number of tables in the DBMS increases. In addition, the application software code often needs to be customized based on a low level DBMS application programming interface (API) and the specific DBMS being accessed.

The most common approach for coding database manipulation code is to write, by hand, the computer code needed. Typically, programs need to be written to perform the same repetitive function on every table in the DBMS. The disadvantages of this approach include (a) it requires a technical programming resource to write basic database manipulation code for each table in the system, which takes time; (b) the resulting code is prone to errors, since most of the programming is tedious and repetitive; (c) each line of code is tested during unit testing, since each line was coded by hand; (d) it requires valuable programming resources when program developers could be utilized on other programming tasks; and (e) changes to the specific underlying API or to the coding structure in general are applied to the code.

SUMMARY

The present invention comprises a system and method to allow creation of an executable procedure for use in accessing a database management system ("DBMS") by other software, e.g. application software. Code for the desired data object is created by dynamically obtaining a set of data representative of and useful in manipulating a DBMS and its components, e.g. DBMS tables, from a preexisting DBMS system catalog; merging the set of data with source code comprising a predetermined template object source code that comprises object methods and object properties useful in manipulating the table; and generating a source file containing the merged template object source code to create executable code, e.g. by compiling or interpreting the merged template object source code as required by its target language.

A system for generating an executable procedure to accomplish the methods disclosed herein may comprise an interrogation processor, used for interrogating system information associated with the DBMS and deriving database characteristics from the interrogated system information; a source of a template object source code, the template object source code being useful for accessing the database; and a code generator for merging the template object source code with the derived database characteristics to provide a merged object source code for use in manipulating data in the database.

The scope of protection is not limited by the summary of an exemplary embodiment set out above, but is only limited by the claims.

BRIEF DESCRIPTION OF THE DRAWINGS

These and other features, aspects, and advantages of the present invention will become more fully apparent from the following description, appended claims, and accompanying drawings in which:

DETAILED DESCRIPTION OF THE PREFERRED EMBODIMENT

As used herein, "database" or "DBMS" may comprise a relational database, an object oriented database, a flat file, a comma delimited file, or the like, or combinations thereof. Additionally, "table" as used herein may be a part of a DBMS or may be free standing, i.e. not included in the DBMS' native structure. As will be familiar to those of ordinary skill in the database arts, a "system catalog" is a data dictionary of a DBMS and stores meta-data including the schemas of the databases. It is typically stored within the DBMS in one or more special tables that can be queried by users like any other table. As used herein, "DBMS system catalog" may therefore be either an interrogatable system catalog that is part of the DBMS structure, e.g. information about a table's fields and their data characteristics; information about fields and their data characteristics derivable from a free-standing table; information about fields in a comma-delimited, spreadsheet, or other flat file; and the like, according to the data being accessed. Accordingly, as used herein, "DBMS system catalog" is understood to mean an interrogatable collection of description of characteristics of data within a DBMS or a table in the DBMS, and can include a field definition row in a spreadsheet, a field definition record in a flat or comma delimited file, and the like, or combinations thereof. As used herein, a "schema" is a description of the tables, indexes, constraints, and the like contained within a DBMS.

As used herein, "source code" and "source code module" are understood to mean a collection of editable programmatic instructions which, when compiled or interpreted, create an executable software object as these terms are understood by those of ordinary skill in the computer programming arts.

Figure 1:
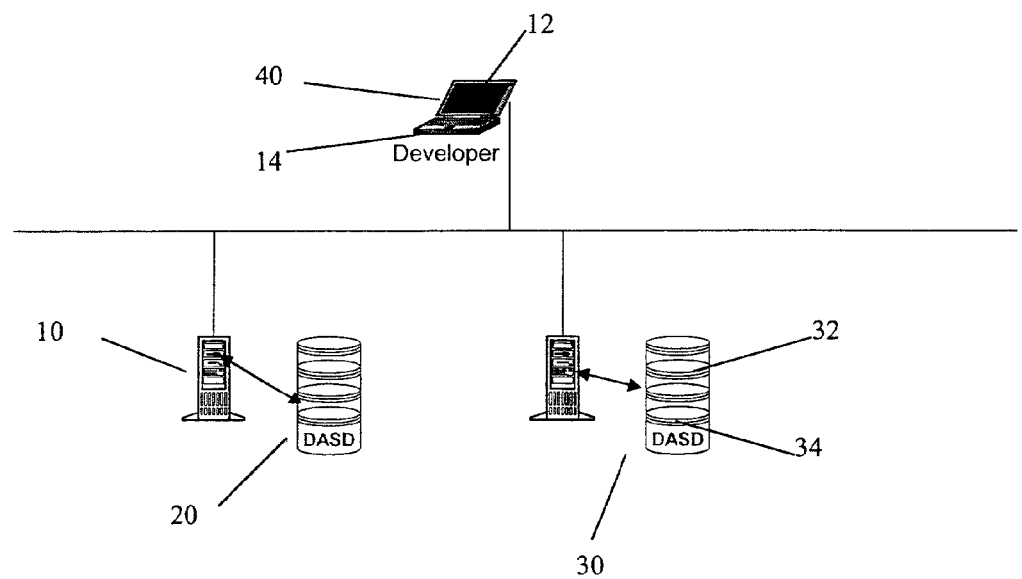
FIG. 1 is a schematic of an exemplary system.
Figure 2:
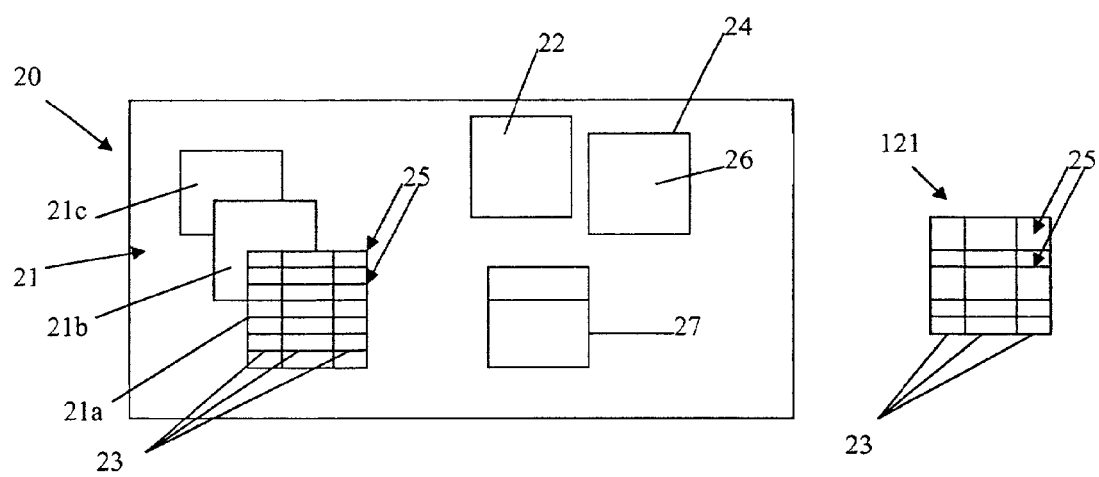
FIG. 2 is a schematic chart of an exemplary DBMS showing tables with records and fields, objects, and a DBMS system information store.

Referring now to both FIG. 1, a schematic of an exemplary system of the present invention, and FIG. 2, a schematic of an exemplary database, a preferred embodiment of a system of the present invention comprises interrogation processor 10; source 30 of template object source code 32; and code generator 40. DBMS 20 is typically a pre-existing DBMS, e.g. an industry standard relational DBMS. Further, DBMS 20 and source 30 may be resident on a storage device associated with either of interrogation processor 10 and code generator 40.

It is understood that interrogation processor 10 and code generator 40 may be separate or a unitary computer systems, e.g. a single personal computer or several networked personal computers having mass storage devices or the like.

Interrogation processor 10 is used to interrogate DBMS 20 for system information 22 associated with DBMS 20 and derive database characteristics 26 from the interrogated system information 22, e.g. a database schema embodied in DBMS system catalog 24 (FIG. 2).

DBMS 20 may be a true database, comprising tables 21 and optionally other elements. As used herein, the numeral "21" refers to tables in DBMS 20 generally, with each such table in DBMS 20 identified as "21*a*," "21*b*," and the like.

As used in the art, independent or freestanding tables 121, individually referred to by "121*a*" and "121*b*," are sometimes also referred to as a database, such as with older database systems such as so-called xBase database systems like Visual FoxPro® marketed by Microsoft Corp. of Seattle, Wash. Both types of tables, e.g. table 21*a* in tables 21 and table 121*a* in freestanding tables 121, typically comprise one or more records 25. As shown in FIG. 2, each record 25 (also referred to as row 25) in a table such as table 21*a* or 121*a* comprises one or more fields 23 (also referred to as columns 23). Some DBMS systems 20 also provide validation and integrity rules for fields 23, records 25, and the like.

Additionally, especially in modern databases, DBMS 20 may be or otherwise comprise software objects 27.

As will also be familiar to those of ordinary skill in the database arts, fields 23 may have characteristics such as a name, a field type, a data field data length, a null character indicator, an index indicator, and the like, or combinations thereof.

Figure 3:
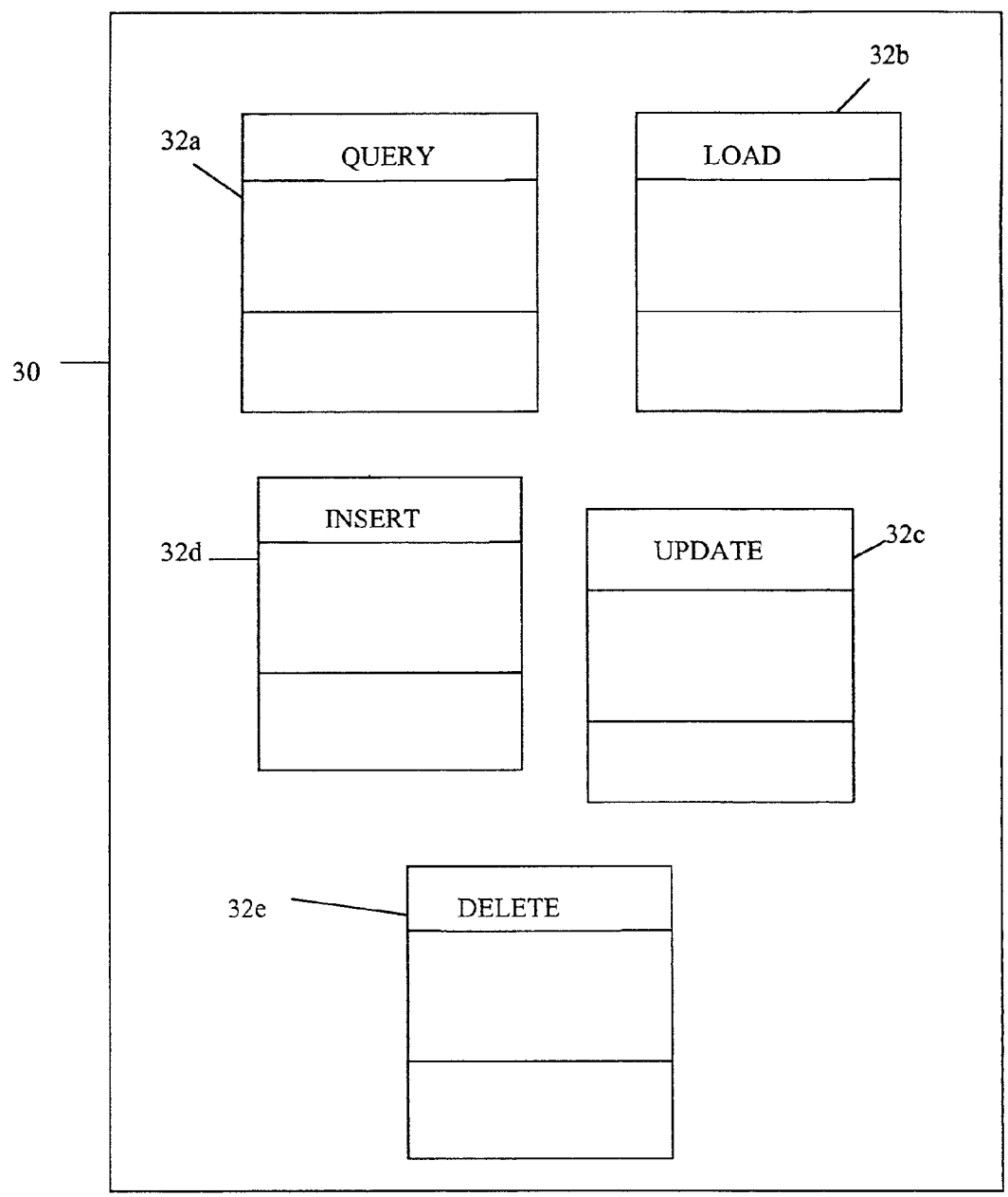
FIG. 3 is a schematic view of a set of template objects.

Referring additionally to FIG. 3, source 30 comprises one or more template object source code modules 32, e.g. 32*a*–32*e*, which are software objects which may be used to create basic database manipulation code for each table, e.g. 21*a*, 121*a* (FIG. 2). In FIG. 3, individual software objects are referenced by a letter designator, e.g. a template query software object is shown as object 32*a*. Code generator 40 may customize a desired template object source code 32, e.g. template insert software object 32*a*, by merging template object source code 32 with database characteristics 26 derived from DBMS system catalog 24, as is described herein below.

Template object source code modules 32 may vary depending on several factors related to DBMS 20 upon which generated object source code 34 may be dependent, e.g. the actual underlying application program interface ("API") for DBMS 20 that is being used (such as ActiveX® Data Objects ("ADO"), Java Database Connectivity ("JDBC"), and the like) and the target DBMS 20, e.g. Microsoft® SQL Server, Oracle®, or IBM® DB2®.

Each template object source code 32 module may comprise one or more object methods and one or more object properties useful in accomplishing its task in general, e.g. object methods and object properties useful in accessing DBMS 20 such as predetermined object methods and object properties supporting manipulation of data from at least one of fields 23, records 25, database objects 27, tables 21,121, and/or an entire DBMS 20. Accordingly, in a preferred embodiment, the object methods and object properties of merged object source code 34 may be used by an application invoking merged object source code 34 to manipulate a specific DBMS 20. As used herein, "manipulate" means to access and modify DBMS 20 and its data, e.g. opening DBMS 20, opening table 21*a*, 21*b*, 21*c*, 121*a*, 121*b*, loading table 21*a*, 21*b*, 21*c*, 121*a*, 121*b* such as with template load object 32*b*, retrieving record 25, querying DBMS 20 and/or table 21*a*, 21*b*, 21*c*, 121*a*, 121*b* such as with template query object 32*a*, inserting a new record 25 in table 21*a*, 21*b*, 21*c*, 121*a*, 121*b* such as with template insert object 32*d*, updating an existing record 25 in table 21*a*, 21*b*, 21*c*, 121*a*, 121*b* such as with template update object 32*c*, deleting record 25 in table 21*a*, 21*b*, 21*c*, 121*a*, 121*b* such as with template delete object 32*e*, closing table 21*a*, 21*b*, 21*c*, 121*a*, 121*b*, and closing DBMS 20, or the like, or a combination thereof.

In a preferred embodiment template object source code 32 comprises source code defining an executable procedure for querying or selecting records, e.g. query records 25 by a primary key; loading a table template, e.g. load a entire table 21*a*, 21*b*, 21*c*, 121*a*, 121*b*; inserting a record template, e.g. insert a new record 25 into table 21*a*, 21*b*, 21*c*, 121*a*, 121*b*; updating a record template, e.g. update an existing record 25 based on a primary key; deleting a record template, e.g. delete record 25 based on the primary key; or the like; or combinations thereof.

The object methods may be further tailorable, e.g. to update only changed fields 23, verify that data is consistent with a predetermined data type such as a data type required by field 23, process empty fields 23 in accordance with requirements of table 21*a*, 21*b*, 21*c*, 121*a*, 121*b* and/or DBMS 20, convert data from a first type to a second type compatible with requirements of table 21*a*, 21*b*, 21*c*, 121*a*, 121*b* and/or DBMS 20, or the like, or combinations thereof. For example, a query template may comprise object methods and object properties to allow invocation of the compiled query object to accomplish a query and return the results of that query.

In a preferred embodiment, template object source code 32 may also comprise object methods to accomplish the following tasks: for a Query, populate private data members for merged object 34 (FIG. 1) from a "result set" returned from DBMS 20; for an Insert, validate that required fields 23 are present and have the appropriate data type and data characteristics; for an update, only update fields 23 that actually changed. i.e., have new values; verify that the actual data is correct for the data type of the requisite field 23, e.g., validate that field 23 defined as an integer contains a valid integer; perform predetermined edit checks. e.g., ensure that the length of a text field 23 does not exceed the maximum specified in the database definition; remove leading and/or trailing spaces from a text field 23; convert empty text fields 23 to database "nulls;" handle special characters imbedded in text fields 23, e.g., quotes within quotes; convert the programming language's data types into DBMS specific data types, e.g., many DBMS systems 20 store dates and times in different formats; and provide standardized methods for other programs in the an application to retrieve data from the data object ("get" methods) and to store data into the data object ("set" methods).

Accordingly, merged object source code 34 may be used for manipulating data from a predetermined section of DBMS 20, e.g. record 25, a table 21*a*, 21*b*, 21*c* associated with DBMS 20 or a freestanding table 121*a*, 121*b*, database object 27, and database system catalog information 24, or the like, or a combination thereof.

Referring back to FIG. 1, code generator 40 creates merged object source code 34 by merging database characteristics 26 derived from DBMS system catalog 24 with template object source code 32 to provide merged object source code 34 which can then be used to manipulate data in DBMS 20. Code generator 40 may further comprise display 12 and input 14. Input 14 may be one or more input devices such as are known in the art, e.g. a keyboard, mouse, or other computer input device as will be understood by those of ordinary skill in the computer arts.

Figure 4:
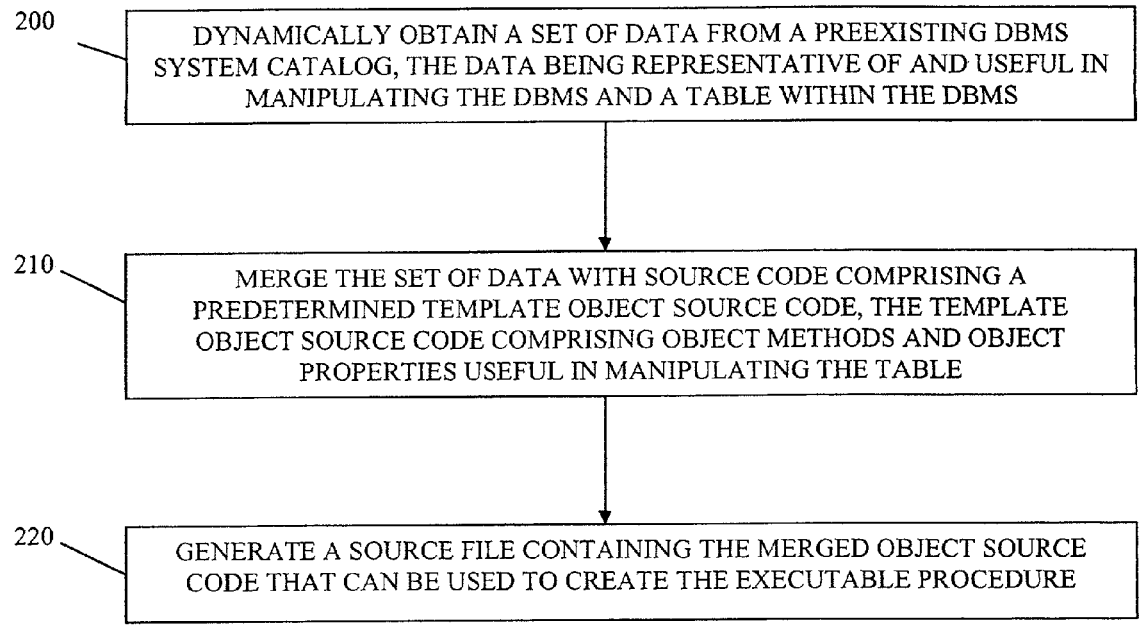
FIG. 4 is a flowchart of a preferred method.

In the operation of a preferred embodiment, and referring additionally to FIG. 4, the present invention further comprises one or more development tools that may be used during a development phase of a project to create objects 34 (FIG. 1) to perform common database manipulation routines, e.g. input-output procedures, for each desired table 21a, 21b, 21c (FIG. 1) in DBMS 20 (FIG. 1) or freestanding table 121a, 121b (FIG. 1).

In a preferred embodiment, the present invention assumes that details needed to generate the database manipulation code for each table 21a, 21b, 21c are already known and accessible in DBMS system catalog 24 of DBMS 20 or otherwise available for freestanding tables 121. This is true for such relational DBMS systems as Microsoft® SQL Server, Oracle®, IBM® DB2®, and Microsoft® Visual Foxpro®.

In a preferred embodiment, a user, e.g. a programmer, invokes a user interface at code generator 40 (FIG. 1) during the development of an application system to dynamically obtain a set of data, at step 200, from a preexisting DBMS system catalog 24 (FIG. 1) of DBMS 20 (FIG. 1). DBMS system catalog 24 may be obtained directly from DBMS 20, from a database script file, or the like. The set of data may be derived from DBMS system catalog 24 by interrogation processor 10 (FIG. 1). For example, interrogation processor 10 may use a standardized database API to access DBMS system catalog 24 of the desired DBMS 20.

The set of data is representative of and useful in manipulating DBMS 20 (FIG. 1) and its tables 21 (FIG. 1). Once names of tables 21 within DBMS 20 have been determined, predetermined parameters are processed such as from a memory array or from a file to retrieve information required to set up an environment that includes locations and other characteristics of template object source code 32 (FIG. 1). Additionally, predetermined parameters may be obtained from freestanding tables 121 and processed. These characteristics may comprise language type, DBMS type, server name, database name, connection settings, and the like. In a like manner, locations and other characteristics of merged object source code 34 (FIG. 1) may be processed, e.g. language type, data access methods, naming conventions, and the like. In a typical configuration, DBMS system catalog 24 will be interrogated for the name of each field 23; predetermined characteristics of each field 23, e.g. data type, data field length, data format requirements, and "nullable" indicator; and an index value, e.g. whether field 23 is a primary key.

The user may also specify one or more startup parameters such as via input 14.

In a preferred embodiment, an object may then be defined to comprise object properties describing predetermined characteristics of data types which will be further accessible using the object, where these data types are present in DBMS 20 (FIG. 1) as well as in one or more target languages for the data object, e.g. Java or C++. At least one data object is then created for each table 21a, 21b, 21c, 121a, 121b (FIG. 1) in DBMS 20 (FIG. 1). A database object creation routine may be run once per each such data object, e.g. in a loop processing each table 21a, 21b, 21c, 121a, 121b found. Alternatively, all tables 21 for DBMS 20 may be processed automatically such as via an API to DBMS 20.

Once obtained, the set of data obtained from DBMS system catalog 24 (FIG. 1) is merged, at step 210, with a predetermined template object source code 32 (FIG. 1) to create merged object source code 34 (FIG. 1). For example, template object source code 32 may be populated with pre-existing source code into which one or more place holders exist, e.g. by substitution of a value for a place holder, such as where the place holders are identifiable by the merging process and relate to a predetermined set of data obtained from the preexisting DBMS system catalog 24 (FIG. 1) of DBMS 20 (FIG. 1). In this manner, a "get" method in template source 34, which may be invoked by a software application to obtain values in one or more fields of a record in a table, e.g. table 21a, would have a place holder allowing for identification of each field obtained from the preexisting DBMS system catalog 24 (FIG. 1) of DBMS 20 (FIG. 1).

In an alternative embodiment, the set of data obtained from DBMS system catalog 24 (FIG. 1) is examined and one or more of characteristics of the data is determined. A template is then identified which corresponds to the characteristics for each datum in the set of data, and that datum is merged into its corresponding template in template object source code 32. For example, template insert software object 32a may comprise the string "INSERT" for a structured query language (SQL) target, and the merge process may build a further string containing the template "INSERT" with appended names of columns 23 gleaned from DBMS system catalog 24 (FIG. 1). If columns 23 named "ONE," "TWO," and "THREE" are to exist in table 21a named "TBL," the resulting merged string would be "INSERT INTO TBL (ONE,TWO,THREE) VALUES (var1, var2, var3)" where var1, var2, and var3 would be program determined variables appropriate for columns 23 named "ONE," "TWO," and "THREE" in table 21a.

In a preferred embodiment, when the characteristics for template object source code 32 and merged object source code 34 have been obtained, as well as the information regarding DBMS 20, an output file may be created. The output file may be provided with a standard header as required by a target language, including header information required for a desired software object class. As will be understood by those of ordinary skill in the software object oriented programming arts, a software object is defined via its class, i.e. an object is an individual instance of the class to which it belongs.

Member variables may then be generated for the class, based on definitions of tables 21,121 for which the class is being defined. Additional elements for the object class may then be created for the class, e.g. constructors, get methods, put methods, and the like, or combinations thereof. Specialized methods may also be created for the class, e.g. for database views present within DBMS 20. Characteristics for template object source code 32 and merged object source code 34 may be validated during the processing.

In addition to these methods and properties, a set of SQL code may be created to allow access and manipulation of DBMS 20 (FIG. 1), depending on the requirements of that DBMS 20. This SQL code may include dynamic and static syntactical statements and routines to allow loading of data, updates, inserts, deletions, executing of stored procedures, and the like. Additionally, methods to process data loaded from DBMS 20 as well as validation methods are created for the class.

The merged object source code 34 may then be stored, at step 220, such as created as an editable or otherwise manipulatable text source file and written to disk.

Merged object source code 34 may then be used to generate executable code containing the desired data object, e.g. merged object source code 34 may be generated in a desired target language such as C, C+, C++, C#, Visual Basic, COBOL, SQL, Java, or the like, or a combination thereof for further compilation or interpretation. Merged object source code 34 may then handled just like any other source file that the programmer develops, e.g., checked into a software repository, compiled, unit tested, and the like. A predetermined programming language's data types may also be converted into one or more data types specific to DBMS 20.

In a preferred embodiment, merged object source code 34 are to be used in a target application as "containers" to hold data for a specific table 21a, 21b, 21c, 121a, 121b. Data coming from DBMS 20 and going to DBMS 20 will thus pass through the compiled or interpreted merged object source code 34. Other programs in the software application, e.g. "classes" in object oriented applications, may use "get" and "set" methods of merged object source code 34 to retrieve data from the data object 34 and to store data into the data object 34. With this mechanism, application business logic does not need to know the details of how the data is actually stored in DBMS 20, e.g., which DBMS 20 or table 21a, 21b, 21c, 121a, 121b is being used, structures of tables 21,121, and the like.

Unit testing may also be improved, since code generator 40 produces application code specific to a table 21a, 21b, 21c, 121 in the generated code conforms to a desired "model" code, template 32. Further, changes to a specific underlying API or to the coding structure in general can be applied to one place, e.g. templates 32, and code generator 40 can be rerun to recreate the code 34 for each table 21a, 21b, 21c, 121a, 121b instead of having to make changes manually. Similarly, common rules that need to be applied across DBMS 20 need to be coded once, e.g. in templates 32.

In the preferred embodiment as described herein, programmatic errors may be detected in a earlier, development phase, decreasing the likelihood of a runtime error. However, in a currently envisioned alternative embodiment, the present invention may be used in a runtime environment during real-time operation of a software application such that database manipulation code could be created dynamically while the application is running.

As will be familiar to those of ordinary skill in the database arts, other object methods may be present as desired to help maintain one or more standards of DBMS 20, its tables 21, freestanding tables 121, and their records 25 and fields 23. For example, programmers often desire to remove leading and/or trailing spaces from text fields 23, convert empty fields 23 to database "nulls," and/or handle special characters imbedded in text fields 23 such as by substitutions for or deletions of those special characters. One or more methods to accomplish these tasks may be present in template source code 32 to handle these in a consistent manner.

The present invention may be used in application systems that need to manipulate data in DBMS 20, e.g. client/server application systems that require records to be stored into and retrieved from DBMS 20. Among other advantages, the present invention may free up development time, allowing programmers to be utilized on other programming tasks; programming errors may be eliminated that may have resulted if the code were programmed by hand; unit testing may be faster as each line of code automatically conforms to the "model" code; changes to a specific underlying API or to the coding structure in general can be applied to one place, i.e. templates 32; and common rules that need to be applied to manipulate DBMS 20 need to be coded once.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A method for providing an executable procedure for use in accessing a database management system (DBMS), comprising the steps of:
   a. dynamically obtaining a set of data from a preexisting DBMS system catalog, the data being representative of and usable in manipulating the preexisting DBMS and a table within the preexisting DBMS;
   b. merging the set of data with source code comprising predetermined template object source code, the template object source code comprising an object method and an object property useful in manipulating the table; and
   c. generating a source file containing the merged object source code useful in creation of an executable procedure for updating data in the preexisting DBMS.

2. A method according to claim 1, wherein:
   a. the preexisting DBMS system catalog further comprises information relating to fields within a table of the preexisting DBMS.

3. A method according to claim 1 wherein:
   a. the template object source code is at least one of a (a) query template, (b) load table template, (c) insert record template, (d) update record template, and (e) delete record template.

4. A method according to claim 3, wherein:
   a. the set of data is merged with query template source code; and
   b. the merged query object source code further comprises an object method useful in populating private data members in an object derived from the query object source code with data from the set of data obtained from the preexisting DBMS.

5. A method according to claim 3, wherein:
   a. the set of data is merged with insert record template source code; and
   b. the merged insert record object source code further comprises an object method for verifying that fields required by the table are present.

6. A method according to claim 3, wherein:
   a. the set of data is merged with update record template source code; and
   b. the merged update record object source code further comprises an object method for selectively updating table fields whose data have changed.

7. A method according to claim 1 further comprising the step of;
   a. generating merged object source code comprising an object method for verifying that data are correct for a data type of a desired field.

8. A method according to claim 1 further comprising the step of:
   a. generating merged object source code comprising an object method for performing predetermined edit checks.

9. A method according to claim 1 further comprising the step of:
   a. generating merged object source code comprising an object method for removing undesired spaces from predetermined text fields.

10. A method according to claim 1 further comprising the step of:

a. generating merged object source code comprising an object method for converting empty fields to database nulls.

11. A method according to claim 1 further comprising the step of:
a. generating merged object source code comprising an object method for handling special characters imbedded in text fields.

12. A method according to claim 1 further comprising the step of:
a. generating merged object source code comprising an object method for converting a predetermined programming language's data types into data types specific to the preexisting DBMS.

13. A method according to claim 1, wherein:
a. the method of claim 1 is performed during a development phase of a project to produce a merged object source code for a selected table in the preexisting DBMS.

14. A method according to claim 1, wherein:
a. the merged object source code is created for at least one of (i) C, (ii) C++, (iii) C#, (iv) Visual Basic, (v) COBOL, and (vi) Java.

15. A method according to claim 1, wherein:
a. the preexisting DBMS is at least one of a (i) relational database, (ii) comma delimited file, (iii) a flat file, and (iv) a spreadsheet.

16. A system for generating an executable procedure for accessing a database management system (DBMS), comprising:
a. an interrogation processor for interrogating system information associated with a DBMS and deriving DMBS characteristics from the interrogated system information;
b. a source of a template object source code, the template abject source code being useful for updating the DBMS; and
c. a code generator, operatively in communication with the interrogation processor and the source of template abject source code, the code generator being useful for merging the template object source code with the derived characteristics of DBMS to provide a merged object source code for use deriving an executable procedure for updating data in the DBMS.

17. A system according to claim 16, wherein:
a. the template object source code includes template object source code for a plurality of template objects; and
b. the code generator merges template object source code for a selected one of the plurality of template objects with the derived characteristics of the DBMS.

18. A system according to claim 16, wherein:
a. the template object source code comprises predetermined object methods and object properties supporting manipulation of data from at least one of a (i) field, (ii) record, (iii) database object, (iv) table, and (v) DBMS.

19. A system according to claim 16, wherein:
a. the system information comprises at least one of (i) a name of a data field, (ii) a data field type, (iii) a data field data length, (iv) a null character indicator, and (v) an index indicator.

20. A system according to claim 16, wherein:
a. the merged object source code is used for manipulating data from a predetermined portion of the DBMS comprising at least one of (i) a record, (ii) a DBMS table, (iii) a DBMS object, and (iv) information from database system catalog.

21. A system according to claim 16, wherein:
a. the merged object source code is used for at least one of (i) opening a DBMS, (ii) opening a table, (iii) loading a table, (iv) retrieving a record, (v) querying a DBMS, (vi) inserting a new record in a table, (vii) updating an existing record in a table, (viii) deleting a record in a table, (ix) closing a table, and (x) closing a DBMS.

22. A system according to claim 16, wherein:
a. the merged object source code is used for at least one of (i) updating only changed database data fields, (ii) verifying data in a record is consistent with a predetermined data type (iii) processing empty data field portions in accordance with requirements of the DBMS, and (iv) converting data type to be compatible with requirements of the DBMS.

23. A method for generating an executable procedure for accessing a database management system (DBMS), comprising the steps of:
a. interrogating system information associated with a DBMS at an interrogation processor;
b. deriving DBMS characteristics from the interrogated system information at the interrogation processor; and
c. merging template object source code, at a code generator, from a source of template object source code, the template object source code being useful for updating the DBMS, with the derived DBMS characteristics to provide a merged object source code for use in updating data in the DBMS.

24. A method according to claim 23, further comprising the step of:
a. merging the derived DBMS characteristics by the code generator with specific template object source code selected from a plurality of template object source code.

25. A method according to claim 23, wherein:
a. the template object source code comprises source code supporting manipulation of data from at least one of a (i) field, (ii) record, (iii) database object, (iv) table, and (v) DBMS.

26. A method according to claim 23, wherein:
a. the system information comprises at least one of (i) a name of a data field, (ii) a data field type, (iii) a data field data length, (iv) a null character indicator, and (v) an index indicator.

27. A method according to claim 23, wherein:
a. the merged object source code is used for manipulating data from a predetermined portion of the DBMS comprising at least one of (i) a record, (ii) a table, (iii) a database object, and (iv) information from a database system catalog.

28. A method according to claim 23, wherein:
a. the merged object source code is used for at least one of (i) opening a DBMS, (ii) opening a table, (iii) loading a table, (iv) retrieving a record, (v) querying a DBMS, (vi) inserting a new record in a table, (vii) updating an existing record in a table, (viii) deleting a record in a table, (ix) closing a table, and (x) closing a DBMS.

29. A method of claim 23, wherein:
a. the merged object source code is used for at least one of (i) updating only changed database data fields, (ii) verifying record data is consistent with a predetermined data type, (iii) processing empty data field portions in accordance with requirements of the DBMS, and (iv) converting data type to be compatible with requirements of the DBMS.

30. A computer program embodied within a computer-readable medium created using the method of claim 1.

* * * * *